US011593495B2

(12) United States Patent
Dekel

(10) Patent No.: US 11,593,495 B2
(45) Date of Patent: Feb. 28, 2023

(54) SIGNING AND VERIFYING MUTABLE STRUCTURED DOCUMENTS

(71) Applicant: VMware, Inc., Palo Alto, CA (US)

(72) Inventor: Edo Yacov Dekel, Tel-Aviv (IL)

(73) Assignee: VMware, Inc., Palo Alto, CA (US)

( * ) Notice: Subject to any disclaimer, the term of this patent is extended or adjusted under 35 U.S.C. 154(b) by 382 days.

(21) Appl. No.: 17/014,926

(22) Filed: Sep. 8, 2020

(65) Prior Publication Data

US 2022/0075885 A1 Mar. 10, 2022

(51) Int. Cl.
*G06F 11/36* (2006.01)
*G06F 16/23* (2019.01)
*G06F 16/93* (2019.01)
*G06F 21/62* (2013.01)

(52) U.S. Cl.
CPC ...... *G06F 21/6209* (2013.01); *G06F 11/3664* (2013.01); *G06F 16/2379* (2019.01); *G06F 16/93* (2019.01); *G06F 21/629* (2013.01)

(58) Field of Classification Search
CPC ............. G06F 21/6209; G06F 11/3664; G06F 16/2379; G06F 16/93; G06F 21/629; G06F 21/554; G06F 21/572
See application file for complete search history.

(56) References Cited

U.S. PATENT DOCUMENTS

| 10,339,299 | B1 * | 7/2019 | Magnuson | H04L 9/3239 |
| 2003/0115461 | A1 * | 6/2003 | O'Neill | G06F 21/57 |
| | | | | 713/170 |
| 2015/0078375 | A1 * | 3/2015 | Hendel | H04L 45/7453 |
| | | | | 370/389 |
| 2017/0116436 | A1 * | 4/2017 | Wu | H04W 12/02 |
| 2019/0361842 | A1 * | 11/2019 | Wood | H04L 9/0637 |

OTHER PUBLICATIONS

Omier, E. "Octarine Offers a Platform for Securing Kubernetes Workloads," The New Stack, Nov. 18, 2019, 11 pages, URL: https://thenewstack.io/octarine-offers-a-platform-for-securing-kubernetes-workloads/.

* cited by examiner

*Primary Examiner* — Catherine Thiaw
*Assistant Examiner* — Andrew Suh
(74) *Attorney, Agent, or Firm* — Kim & Stewart LLP

(57) ABSTRACT

A structured document is verified for changes that are made during and after deployment of an application. The structured document includes first fields that are designated as mutable, and second fields that are designated as immutable. An attempted change is detected to the structured document during or after deployment of the application. Upon detecting the attempted change, a digital signature is generated of the second fields of the structured document. A determination is made whether the generated digital signature of the second fields matches a reference digital signature of the second fields. Upon determining that the generated digital signature matches the reference digital signature, the change to the structured document is permitted. Upon determining that the generated digital signature does not match the reference digital signature, the change is blocked to the structured document.

20 Claims, 5 Drawing Sheets

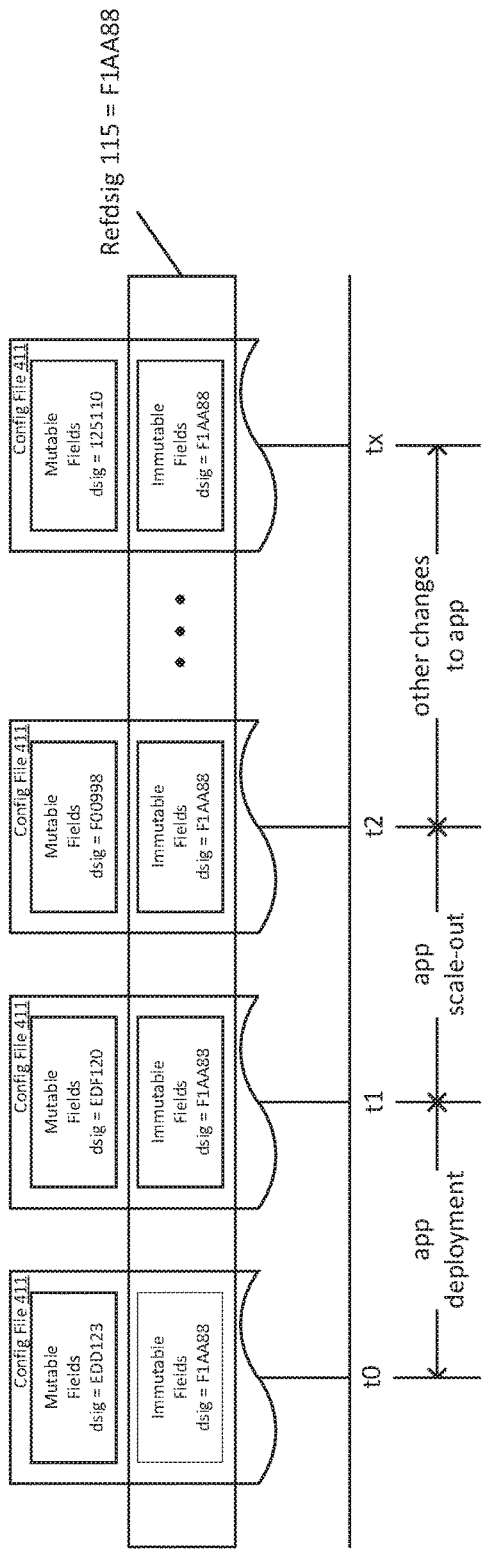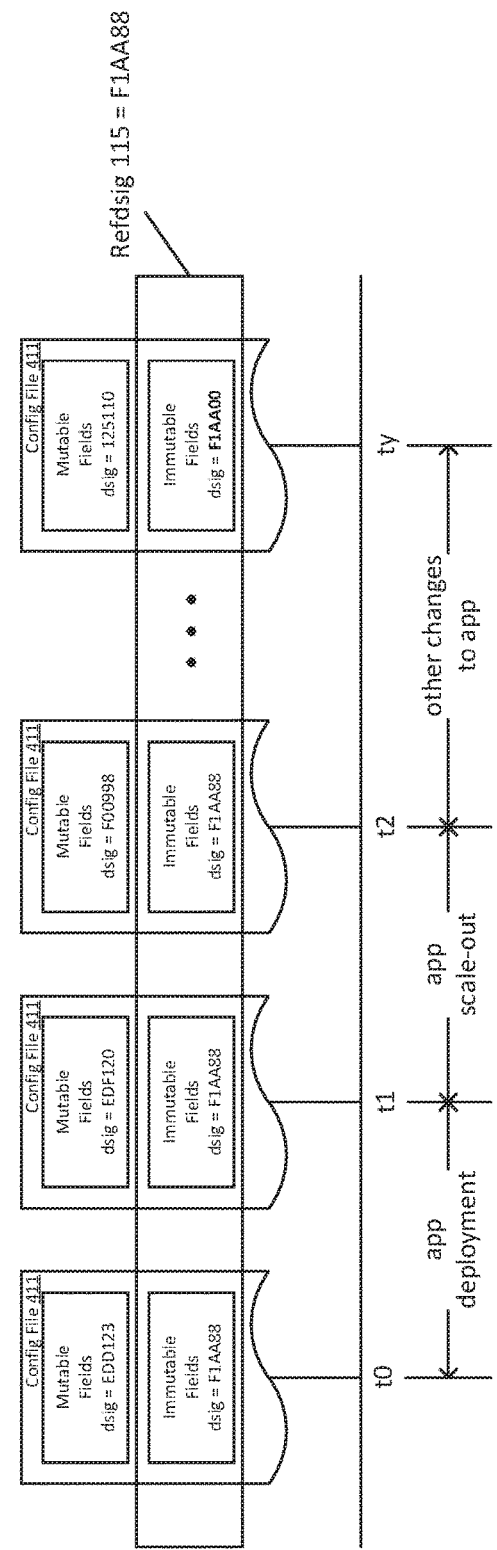

SIGNING AND VERIFYING MUTABLE STRUCTURED DOCUMENTS

BACKGROUND

A popular platform for deploying containerized applications is the Kubernetes® platform. This platform employs a configuration file that has fields containing parameters defining how a containerized application is to be deployed onto the Kubernetes platform. During and after deployment, the fields in the configuration file may change, and these changes are often made purposefully by an authorized user or automatically by the control plane of the Kubernetes platform. It is also possible for the changes to be unintentional, e.g., introduced by authorized but inexperienced users, and for the changes to be malicious, e.g., introduced by unauthorized users.

BRIEF DESCRIPTION OF THE DRAWINGS

FIGS. 5 and 6 are conceptual diagrams that illustrate changes in mutable and immutable fields in the configuration file at various points in time during and after deployment of the application in the client environment according to one or more embodiments.

DETAILED DESCRIPTION

One or more embodiments provide techniques to verify that changes to a structured document (e.g., a configuration file) that is used during and after deployment of an application are permitted.

Figure 1:
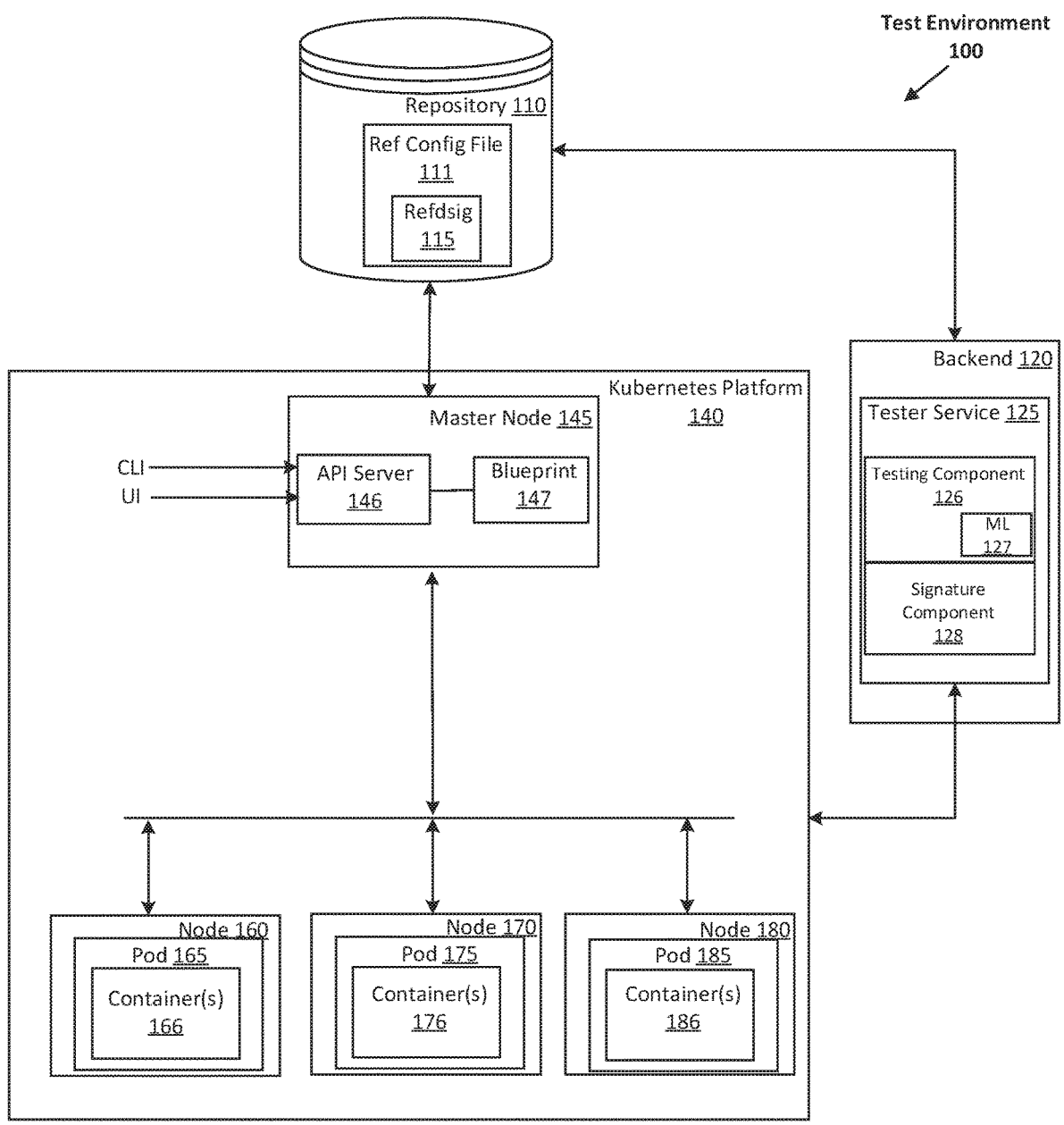
FIG. 1 illustrates components of a test environment in which mutable and immutable fields of a reference configuration file of an application that is deployed in the test environment, are determined according to one or more embodiments.

FIG. 1 illustrates components of a test environment in which mutable and immutable fields of a reference configuration file of an application that is deployed in the test environment 100 are determined according to one or more embodiments. In the embodiments illustrated herein, test environment 100 and client environment 400 (see FIG. 4) are computing environments for a Kubernetes platform and the same application is deployed in test environment 100 and client environment 400. In test environment 100, reference configuration file (ref config file) 111 is a structured document containing configuration parameters that define how the application is to be deployed onto a Kubernetes platform 140. The application is, for example, deployed as a plurality of container images (e.g., containers 166, 176, 186) executing in a plurality of pods (pods 165, 175, 185) that are distributed over a plurality of nodes (nodes 160, 170, 180) that make up a Kubernetes cluster. In FIG. 1, one pod per node is shown for simplicity. In actual implementations, there may be many pods per node. In addition, three nodes are shown in FIG. 1. In actual implementations, there may be any number of nodes.

Kubernetes platform 140 includes a master node 145 having an application program interface (API) server 146 that functions as the control plane for the application deployed onto nodes 160, 170 and 180 according to a blueprint 147. API server 146 generates blueprint 147 based on inputs from a command line interface (CLI) or a user interface (UI), and reference configuration file 111, which is stored in repository 110. Blueprint 147 defines desired states of the application.

Test environment 100 also includes a backend server 120 that executes a tester service 125, which includes a testing component 126 and a signature component 128. Testing component 126 determines which fields of reference configuration file 111 should be mutable or immutable. Mutable fields contain configuration parameters that are permitted to change during deployment of the application or during running of the application, and immutable fields contain configuration parameters that are not permitted to change and remain fixed during deployment of the application and during running of the application. Testing component 126 further includes a machine learning (ML) module 127 that can adjust the determination of what fields are mutable or immutable by undergoing training on modifications to the configuration files that were made during previous deployments of the same application and subsequent execution thereof. Tester service 125 further includes a signature component 128 that digitally signs a digest of a list of immutable fields in reference configuration file 111 to generate reference digital signature (refdsig) 115.

Figure 2:
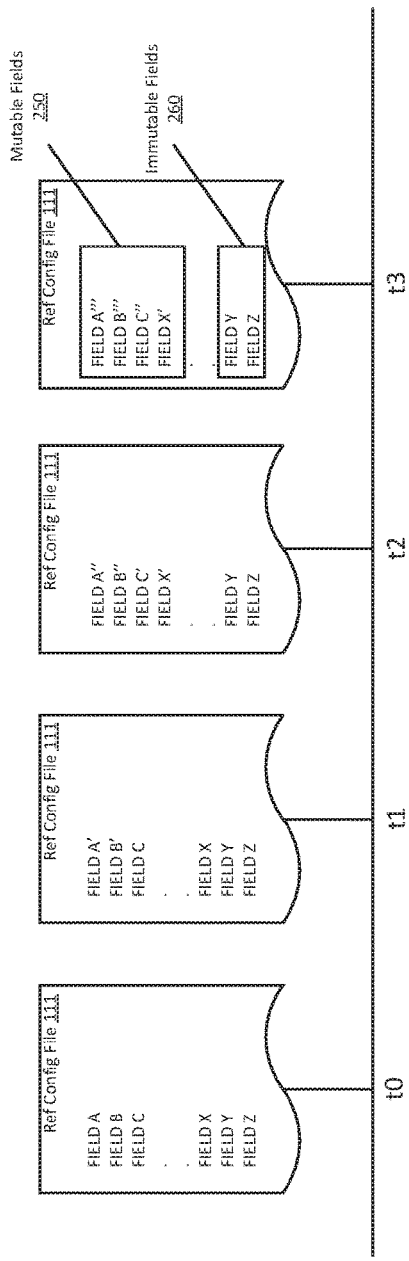
FIG. 2 is a conceptual diagram that illustrates changes in the fields of the reference configuration file of the application during and after deployment of the application and how mutable and immutable fields are determined according to one or more embodiments.

FIG. 2 is a conceptual diagram that illustrates changes in the fields of the reference configuration file of the application during deployment of the application and during running of the application, and how mutable and immutable fields are determined according to one or more embodiments. In the example given in FIG. 2, the start of application deployment is indicated as time t0 and the time period between t0 and t1 represents the time period of application deployment. In addition, the points in time after t1 represent various points in time during the running of the application.

At time t0, reference configuration file 111 stored in repository 110 includes a plurality of fields A, B, C, . . . , X, Y and Z containing configuration parameters. At time t1, that is, at the conclusion of application deployment, reference configuration file 111 contains fields A and B which changed and are illustrated as A' and B', and fields C, X, Y and Z, which remain unchanged.

After time t1, while the application is running, the API server 146 is expected to make changes to the fields of reference configuration file 111. In addition, the test user purposefully makes changes to various settings of the running application by way of the CLI or the UI, for example, a scale-out parameter of the running application, the number of replicas that have been designated for the running application, and the like. As a result, some fields of reference configuration file 111 undergo change while some fields do not. In FIG. 2, at time t2, fields A, B, C, and X are shown as changed, and fields Y and Z are shown as unchanged.

After time t2, the application continues to run after time t2 while the test user purposefully makes all changes to the settings of the running application that can be made. Then, at time t3, testing component 126 examines reference configuration file 111 to determine which fields are mutable or immutable. The fields that changed until time t3, including fields A, B, C, and X are determined to be mutable fields 250 and the fields that remain unchanged until time t3, including fields Y and Z are determined to be immutable fields 260.

Figure 3:
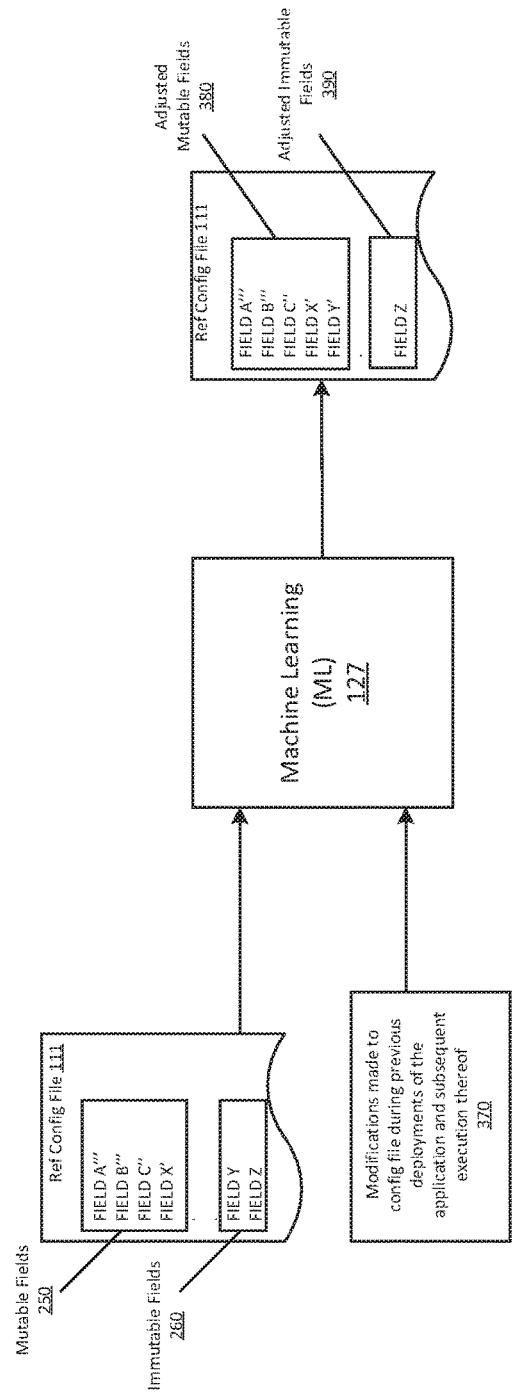
FIG. 3 is a conceptual diagram that illustrates how machine learning is employed in adjusting the determination of mutable and immutable fields of the reference configuration file according to one or more embodiments.

FIG. 3 is a conceptual diagram that illustrates ML module 127, which has undergone training on modifications to the configuration files made during previous deployments of the same application and subsequent execution thereof, and is used to adjust the determination of mutable and immutable fields 250, 260 of reference configuration file 111 according to one or more embodiments. The reason for adjusting the determination of mutable and immutable fields of reference configuration file 111 is that the test performed in the process illustrated in FIG. 2 may not be fully representative of actual deployments and execution of the same application in the client environment. In FIG. 3, two inputs for training ML module 127 is shown. The inputs are (1) the mutable and immutable fields determined in the test process of FIGS. 2 and (2) modifications 370 representing those made to the configuration file during previous deployments of the same application and subsequent execution thereof. Based on these inputs, ML module 127 outputs a final determination of what fields are mutable or immutable in reference configuration file 111. In the example given in FIG. 3, field Y of reference configuration file 111, which was previously determined to be an immutable field, is now determined to be a mutable field as illustrated in adjusted mutable and immutable fields 380, 390.

After the final determination of what fields are mutable or immutable in reference configuration file 111, signature component 128 creates a digest of immutable fields in reference configuration file 111 and digitally signs the digest to generate a reference digital signature (refdsig) 115. Signature component 120 saves the digest of immutable fields and reference digital signature 115 in repository 110 either as a part of a configuration file for the application or as separate files that are associated with the configuration file for the application.

Figure 4:
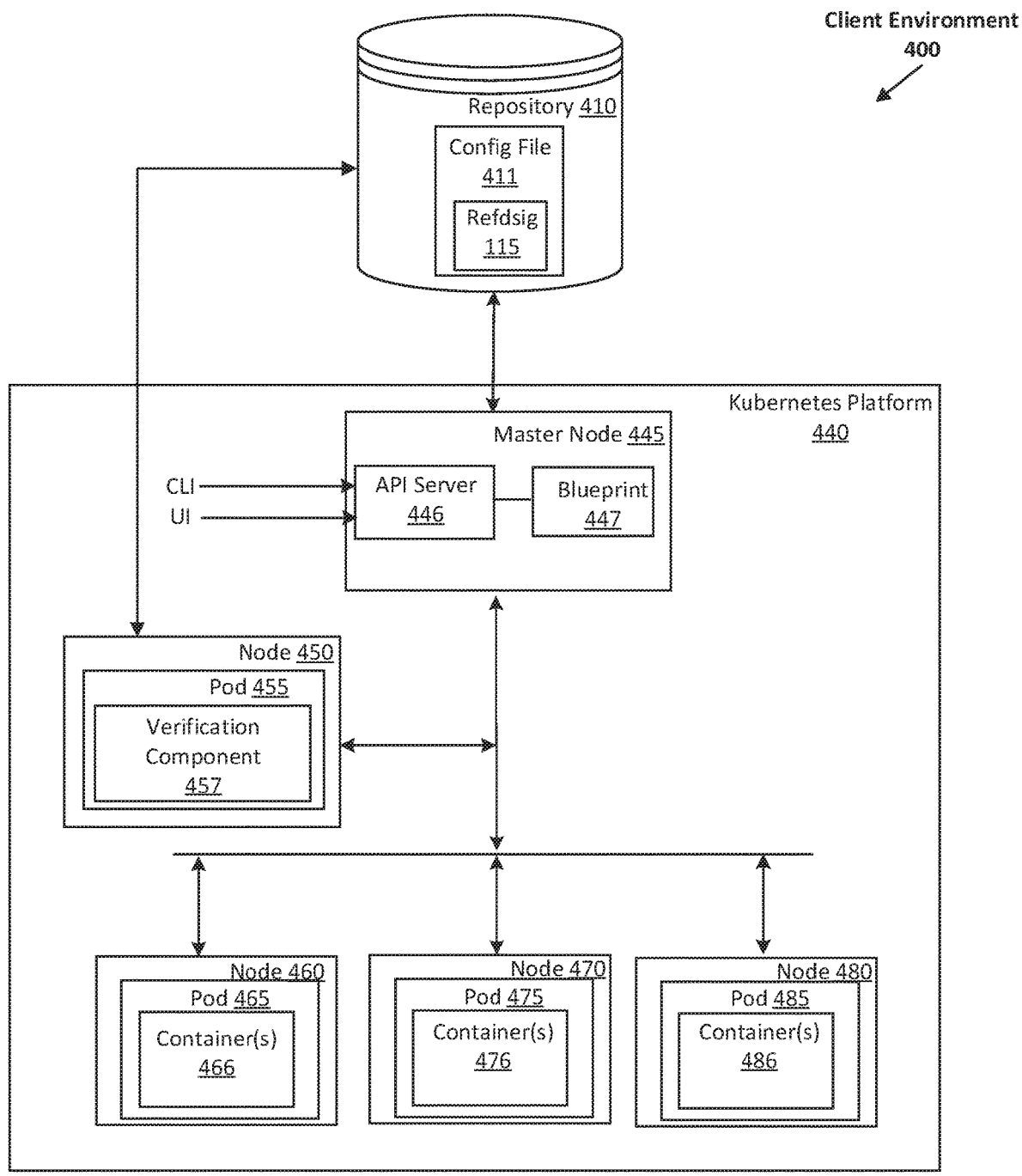
FIG. 4 illustrates components of a client environment in which changes to a configuration file of an application that is deployed in the client environment, are verified according to one or more embodiments.

FIG. 4 illustrates components of a client environment 400 in which changes to a configuration file 411 for an application that is deployed in the client environment, are verified according to one or more embodiments. In the embodiments illustrated herein, it is assumed that the application being deployed into client environment is the same as the application deployed in test environment 100 and so configuration file 411 is the same as reference configuration file 111 at time t0 in FIG. 2. Configuration file 411 is a structured document containing configuration parameters that define how the application is to be deployed onto a Kubernetes platform 440. Configuration file 411 is stored in repository 410 and contains reference digital signature 115 that is generated by signature component 120 as described above.

Kubernetes platform 440 includes a master node 445 having an API server 446 that functions as the control plane for an application deployed onto nodes 460, 470 and 480 according to a blueprint 447. API server 446 generates blueprint 447 based on inputs from the CLI or the UI, and configuration file 411, which is stored in repository 410. Blueprint 447 defines desired states of the application.

The application includes a plurality of container images (e.g., containers 466, 476, 486) executing in a plurality of pods (pods 465, 475, 485) that are distributed over a plurality of nodes (nodes 460, 470, 480) that make up a Kubernetes cluster. In FIG. 4, one pod per node is shown for simplicity. In actual implementations, there may be many pods per node. In addition, three nodes are shown in FIG. 4. In actual implementations, there may be any number of nodes.

Kubernetes platform 440 also include node 450 having a pod 455 in which a container image for a verification component 457 is executed. Verification component 457 detects any changes that are made to configuration file 411 and, upon detecting a change, executes a verification process which is further described below in conjunction with FIGS. 5-7 when it is in the verification mode. Verification component 457 may also be placed in a training mode during which any changes to configuration file 411 are assumed to be permitted and are transmitted to ML module 127 for training.

FIGS. 5 and 6 are conceptual diagrams that illustrate changes in mutable and immutable fields in the configuration file at various points in time during and after deployment of the application in the client environment according to one or more embodiments. FIG. 5 illustrates changes to configuration file 411 which are all permitted. FIG. 6 illustrates one change to configuration file 411 that is not permitted. In both figures, the time period between time t0 and time t1 represents the time period of application deployment, and the time period between time t1 and time t2 represents the time period of application scale-out. Other settings to the application are changed after t2 and one such change which results in a change to configuration file 411 is detected at time tx in FIG. 5 and at time ty in FIG. 6.

Although a digital signature of mutable fields are not generated in the embodiments, sample digital signatures of mutable fields are shown in FIGS. 5 and 6 to illustrate that they are changing between t0 and t1, between t1 and t2, and between t2 and tx/ty. The immutable fields should remain fixed at all times. In FIG. 5, all changes are to mutable fields and no changes are to immutable fields and so all changes to configuration file 411 are permitted in FIG. 5. By contrast, in FIG. 6, the change to configure file 411 is not permitted at time ty because the digital signature of the immutable fields do not match that of reference digital signature 115.

Figure 7:
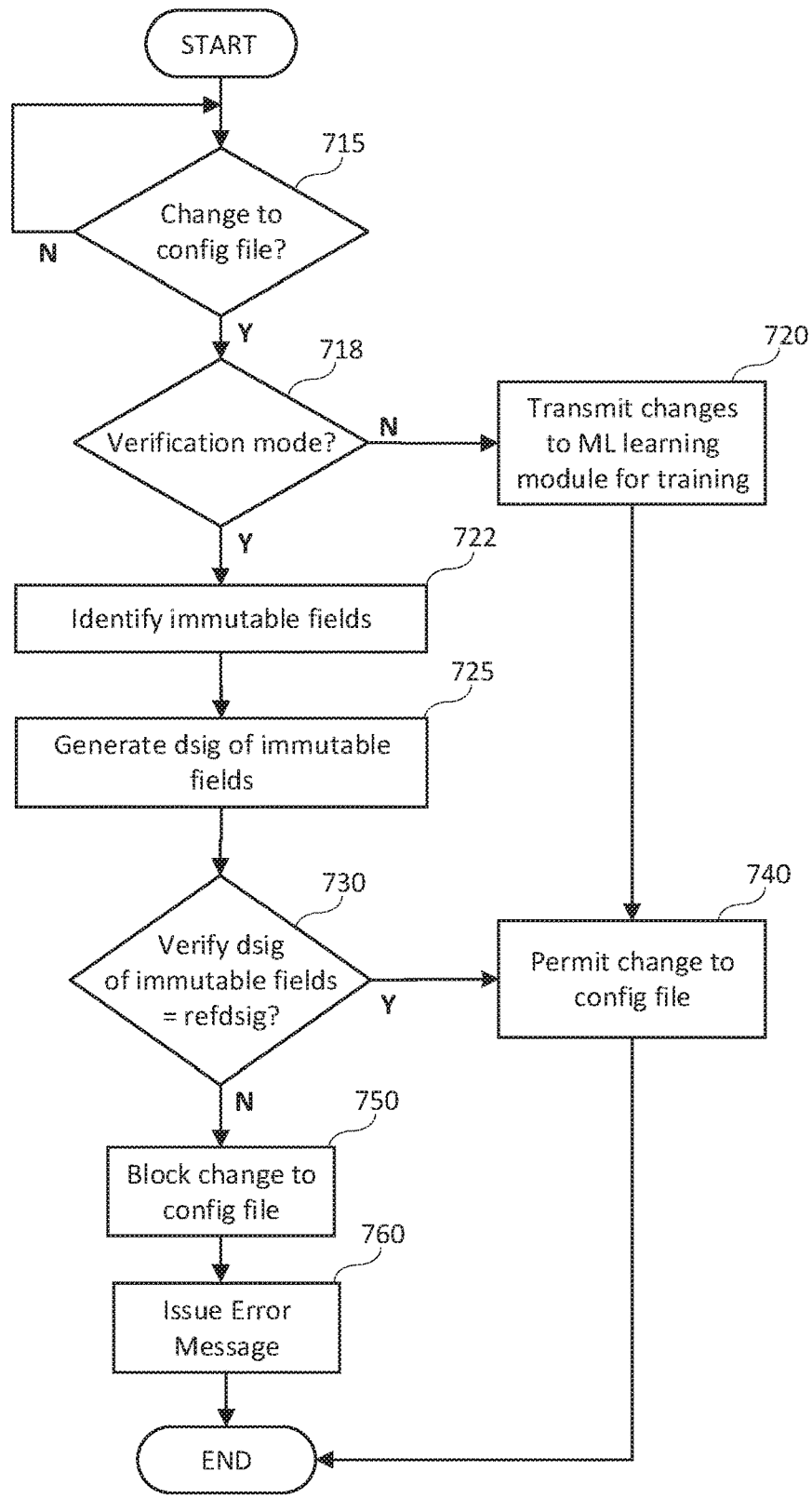
FIG. 7 is a flow diagram that illustrates steps of a method to verify a change to the configuration file for the application during deployment of the application or during running of the application according to one or more embodiments.

FIG. 7 is a flow diagram that illustrates steps of a method to verify a change to the configuration file for the application during deployment of the application or during running of the application according to one or more embodiments.

The method of FIG. 7 begins when verification component 457 detects a change to the configuration file for the application (e.g., configuration file 411) at step 715. The configuration file for the application may change during deployment of the application or the running of the application. Upon detecting the change, verification component 457 at step 718 determines whether or not it is in the verification mode. If not (step 718, No), verification component 457 at step 720 transmits the change to ML module 127 for training, and at step 740 permits the change to the configuration file. On the other hand, if it is in the verification mode (step 718, Yes), verification component 457 identifies the immutable fields of the configuration file using the digest of immutable fields (which is stored in repository 410 and associated with the configuration file) at step 722, and generates a digital signature (e.g., using the same digital signing method that was used to generate the reference digital signature) of the immutable fields of the configuration file at step 725.

Then, at step 730, verification component 457 compares the digital signature generated at step 725 against the reference digital signature (which is stored in repository 410 and associated with the configuration file). If the two digital signatures match (step 730, Yes), verification component 457 permits the change to the configuration file at step 740. If the two digital signatures do not match (step 730, No), verification component 457 blocks the change to the configuration file at step 750 and issues an error message at step 760. The process ends after step 740 or 760.

Embodiments have been described above using testing and verification of configuration files. However, embodiments may be generally applied to testing and verification of any type structured document containing fields which are either mutable or immutable.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Testing and verification systems in accordance with the various embodiments, may be implemented as hosted embodiments, non-hosted embodiments or as embodiments that tend to blur distinctions between the two, are all envisioned. Furthermore, various testing and verification operations may be wholly or partially implemented in hardware. For example, a hardware implementation may employ a comparator to compare digital signatures according to embodiments described herein.

Many variations, modifications, additions, and improvements are possible, regardless the degree of virtualization. Testing and verification applications and software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of verifying changes to a structured document for an application during and after deployment of the application, wherein the structured document includes first fields that are designated as mutable and second fields that are designated as immutable, the method comprising:
   detecting an attempted change to the structured document during or after deployment of the application;
   upon detecting the attempted change, generating a digital signature of the second fields of the structured document;
   determining whether the generated digital signature of the second fields matches a reference digital signature of the second fields;
   upon determining that the generated digital signature matches the reference digital signature, permitting the attempted change to the structured document; and
   upon determining that the generated digital signature does not match the reference digital signature, blocking the attempted change to the structured document.

2. The method of claim 1, wherein
   the permitted change is to the first fields of the structured document, and
   the blocked change is to the second fields of the structured document.

3. The method of claim 1, wherein the structured document is a configuration file for the application.

4. The method of claim 1, wherein the application is deployed onto a Kubernetes platform, and a control plane of the Kubernetes platform makes the attempted change to the structured document.

5. The method of claim 4, wherein a user makes the attempted change to the structured document through a user interface into the Kubernetes platform.

6. The method of claim 1, wherein
the application is deployed and executed in a test environment using a reference structured document to determine which fields of the structured document to designate as mutable and which fields of the structured document to designate as immutable, and
the fields of the structured document to designate as mutable correspond to first fields of the reference structured document that change during the deployment and execution of the application in the test environment, and the fields of the structured document to designate as immutable correspond to second fields of the reference structured document that remain unchanged during the deployment and execution of the application in the test environment.

7. The method of claim 6, wherein the reference digital signature is generated using the second fields of the reference structured document.

8. The method of claim 1, wherein machine learning of modifications to structured documents made during previous deployments of the application and subsequent execution thereof, is used in determining which fields of the structured document to designate as mutable and which fields of the structured document to designate as immutable.

9. The method of claim 1, wherein the reference digital signature is stored in association with the structured document.

10. A non-transitory computer readable medium having instructions stored therein which are executable by a processor to carry out a method of verifying a structured document for an application during and after deployment of the application, wherein the structured document includes first fields that are designated as mutable and second fields that are designated as immutable, the method comprising:
  detecting an attempted change to the structured document during or after deployment of the application;
  upon detecting the attempted change, generating a digital signature of the second fields of the structured document;
  determining whether the generated digital signature of the second fields matches a reference digital signature of the second fields;
  upon determining that the generated digital signature matches the reference digital signature, permitting the attempted change to the structured document; and
  upon determining that the generated digital signature does not match the reference digital signature, blocking the attempted change to the structured document.

11. The non-transitory computer readable medium of claim 10, wherein
  the permitted change is to the first fields of the structured document, and
  the blocked change is to the second fields of the structured document.

12. The non-transitory computer readable medium of claim 10, wherein the structured document is a configuration file for the application.

13. The non-transitory computer readable medium of claim 10, wherein the application is deployed onto a Kubernetes platform, and a control plane of the Kubernetes platform makes the attempted change to the structured document.

14. The non-transitory computer readable medium of claim 13, wherein a user makes the attempted change to the structured document through a user interface into the Kubernetes platform.

15. The non-transitory computer readable medium of claim 10, wherein
the application is deployed and executed in a test environment using a reference structured document to determine which fields of the structured document to designate as mutable and which fields of the structured document to designate as immutable, and
the fields of the structured document to designate as mutable correspond to first fields of the reference structured document that change during the deployment and execution of the application in the test environment, and the fields of the structured document to designate as immutable correspond to second fields of the reference structured document that remain unchanged during the deployment and execution of the application in the test environment.

16. The non-transitory computer readable medium of claim 15, wherein the reference digital signature is generated using the second fields of the reference structured document.

17. The non-transitory computer readable medium of claim 10, wherein machine learning of modifications to structured documents made during previous deployments of the application and subsequent execution thereof, is used in determining which fields of the structured document to designate as mutable and which fields of the structured document to designate as immutable.

18. The non-transitory computer readable medium of claim 10, wherein the reference digital signature is stored in association with the structured document.

19. A computing system comprising:
  a plurality of nodes onto which an application is deployed according to a structured document, wherein the structured document includes first fields that are designated as mutable and second fields that are designated as immutable, one of the nodes includes a processor and memory, and the processor is configured to:
    detect an attempted change to the structured document during or after deployment of the application;
    upon detecting the attempted change, generate a digital signature of the second fields of the structured document;
    determine whether the generated digital signature of the second fields matches a reference digital signature of the second fields;
    upon determining that the generated digital signature matches the reference digital signature, permit the attempted change to the structured document; and
    upon determining that the generated digital signature does not match the reference digital signature, block the attempted change to the structured document.

20. The computing system of claim 19, wherein
the application is deployed and executed in a test environment using a reference structured document to determine which fields of the structured document to designate as mutable and which fields of the structured document to designate as immutable, and
the fields of the structured document to designate as mutable correspond to first fields of the reference structured document that change during the deployment and execution of the application in the test environment, and the fields of the structured document to designate as immutable correspond to second fields of the reference structured document that remain unchanged during the deployment and execution of the application in the test environment.

* * * * *